Patented June 23, 1931

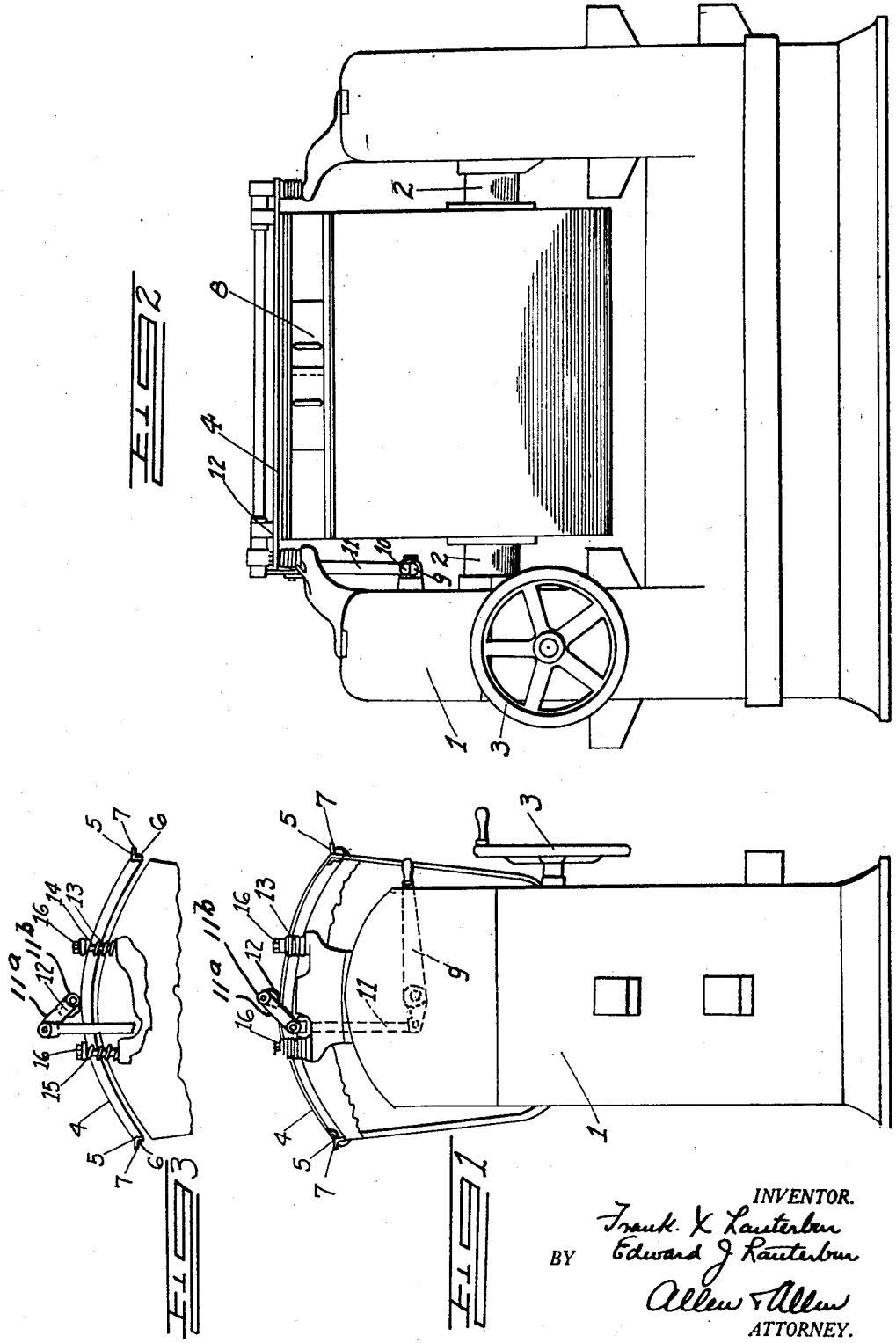

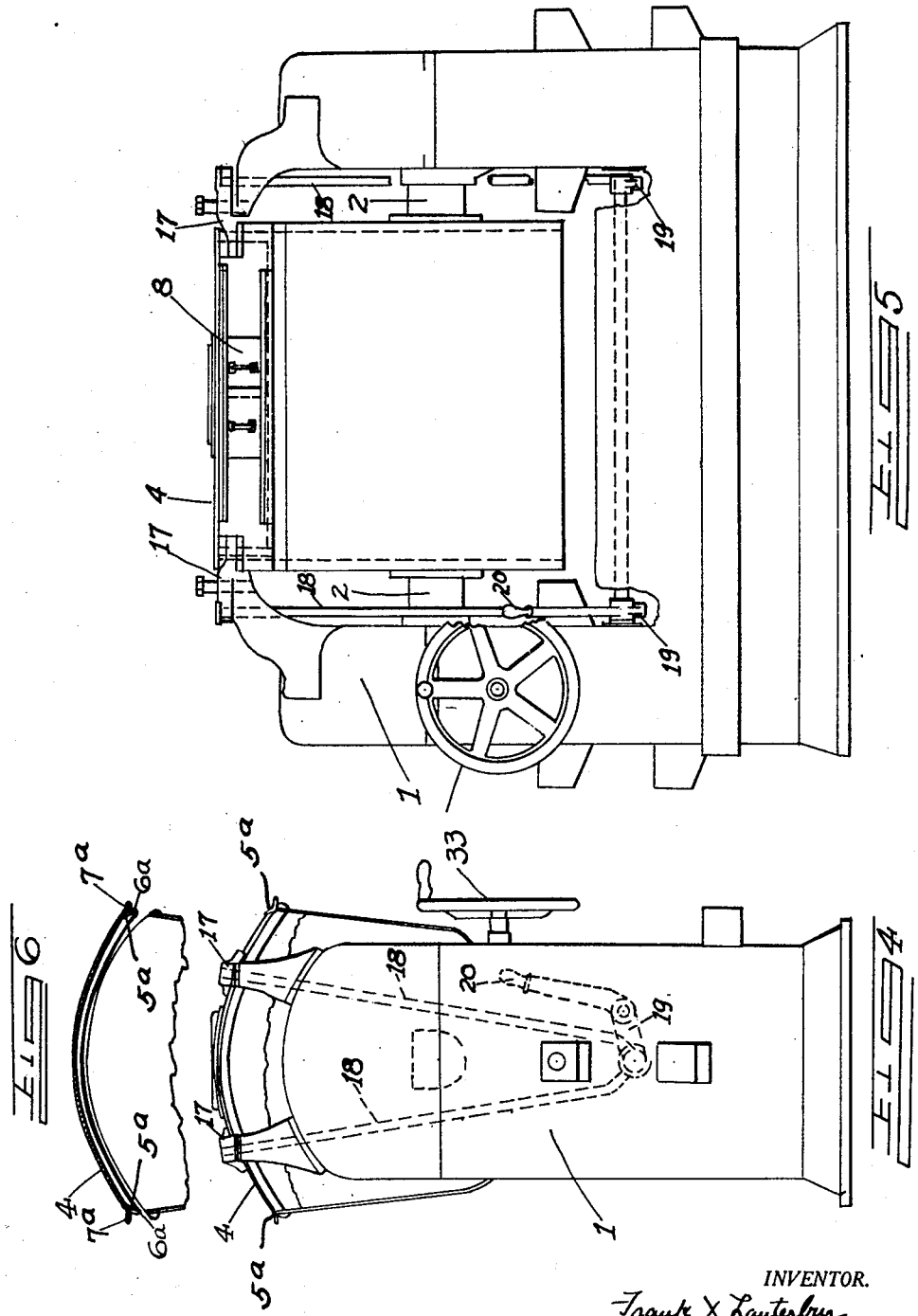

1,811,472

UNITED STATES PATENT OFFICE

FRANK X. LAUTERBUR AND EDWARD J. LAUTERBUR, OF SIDNEY, OHIO

DOUGH MIXER

Application filed June 30, 1926. Serial No. 119,706.

Our invention relates to machines for mixing dough in preparation for the making of bread and other similar products. Specifically our invention relates to closures for dough mixers, which are called in the art lids or covers, and which are required to provide a simple means of discharging the contents of the mixer after the batch is mixed, and to form a closure in an attempt to prevent material from within the bowl from splashing out during the operation of the mixer.

Covers for mixing bowls which seal tightly enough to prevent material from within the bowl from leaking out during the mixing operation have been attempted in the past, but to the best of our knowledge and belief, such covers have only been entirely effective in combination with flat topped bowls. As the latest development in mixers has been in mixers providing a fixed cover and a bowl rotatable or tiltable from under the cover, it will be obvious that the flat top type of cover and bowl is impractical, because in swinging a bowl having a flat top from under a flat cover, such clearance would be needed for the ends of the bowl opening to clear the central portion of the cover, that means having a wide range of movement would need to be provided, and the connecting devices for filling the bowl would have to be re-designed.

It is the object of our invention to provide a mixing bowl preferably of U shape, which shall have end walls having a curved contour, and to provide for such a bowl a cover having depending portions which shall lap preferably on the inside of the side and end walls of the bowl. In order to raise the cover so that the bowl can tilt or rock from under the cover, we have provided means which shall elevate the cover only sufficient distance to allow the depending sides to clear the top of the walls of the bowl. With such means for raising the cover, it is also our object to provide clamping means which will enable an almost perfect seal to be made between the cover and the walls of the bowl during the operation of the mixer.

Referring to the drawings in which we have illustrated a preferred embodiment of our invention:—

Figure 1 is an end elevation of one suitable type of mechanism which enables the raising of the cover of a mixing bowl and the tensioning of the cover in closed position.

Figure 2 is a side elevation of the mixing bowl shown in Figure 1.

Figure 3 is a detail view showing the cover in raised position.

Figure 4 is an end elevation of a modification of the mixer shown in Figures 1–3, in which mechanism is incorporated for raising the cover without the use of springs.

Figure 5 is a side elevation of the mixer illustrated in Figure 4.

Figure 6 is a detail showing the cover in elevated position.

Generally indicated at 1 in both modifications which differ only in the construction, and operative mechanism for raising the lid, is the supporting frame of the machine. Journaled within the frame are the end shafts 2 of the bowl, which form the pivotal mounting for the bowl, so that when it is desired to discharge the contents of the bowl, the bowl is tilted on its pivots. This can be accomplished by suitable gear mechanism, which is not shown, as it forms no part of our invention, which may be actuated by a hand wheel 3. Within the bowl are the usual stirring or mixing blades, which form no part of our invention, and which are consequently not illustrated.

As a closure for the bowls in both modifications, we have provided covers 4 which have suitable means at the edges for interlocking with the top of the walls of the bowls. Various types of beading or angle connections may be used. We have shown in Figures 1–3 inverted angles 5, which have one side 6, which depends within the inside of the wall of the bowl, and another side 7 which rests on top of the bowl wall, and can thus be pressed down against the wall to make a tight joint. In the modifications shown in Figures 4–6, the angle 5a may have a downwardly curved side 6a, which engages resiliently within the bowl wall, and a side 7a which bears against the top edge of the bowl wall. Both modifications show lids having laterally slidable peep doors 8, which forms one novel feature, which is disclosed in our co-pending application, Serial No. 119,705, filed June 30, 1926.

Various mechanisms may be used to raise the cover and to return it to closed position. In Figures 1-3, we have shown a rocking lever 9, having a handle portion 10, for rocking the lever. Pivoted to the end of the rocker opposite the handle is a rod 11 which is operatively connected with a link 11a fixedly mounted on a shaft 11b which has mounted on it a cam shoe 12 which, with the downward movement of the handle 9 will bear against the cover or a reinforced portion of the cover to form a tight closure for the bowl. If desired, in order to raise the cover automatically with the release of the handle, springs 13 may be provided which enclose studs 14, which extend through apertures in bosses 15 on the cover. Adjustment nuts 16 may be threaded on the ends of the studs so that a desired tension may be obtained.

In the modified form shown in Figures 4-6, we have shown the bosses 17 on the cover through which are extended the rods 18 which are pivoted in arms 19 of rockers which have a handle 20 with which the mechanism may be manually operated. In this modified form of cover adjusting mechanism, the force of gravity may be utilized to assist in the downward movement of the cover.

From the above examples it will be obvious that various mechanisms may be used to raise and lower the cover, such as springs, electromagnetic means and pneumatic means, and although we have shown the cover as manually adjusted, it will be further obvious that suitable mechanical connections may be made with the mechanism for tilting the bowl, which may be operatively connected with cover raising mechanism, that at a desired interval of movement of the mechanism for tilting the bowl mechanism for actuating the cover raising mechanism may also be set in operation. An obvious mechanical equivalent structure may be provided for lowering the bowl with relation to the cover instead of raising the cover with relation to the bowl.

It is not our primary desire to claim preferred types of mechanical connections for raising the cover, although we have shown several, the particular feature of our construction being in the general shape of the cover and the fact that we tilt the bowl from under the cover, and provide means for raising the cover so that the bowl can be tilted.

Having thus described our invention what we claim as new and desire to secure by Letters Patent is:—

1. In combination with a mixing machine, a bowl element pivotally mounted on a fixed axis, walls of said bowl having upper edges arcuately shaped along arcuate lines formed with said fixed axis as a center, a cover for said bowl, having a contour similar to that of the upper edges of said walls, depending portions of said covers adapted to seat within said bowl walls to form a tight closure, and means for elevating said cover so as to permit said bowl to be tilted from under said depending portions of said cover.

2. A mixing machine having a bowl pivoted on an axis so as to permit the bowl to rock on said axis, walls of said bowl having upper edges arcuately shaped along arcuate lines formed with said axis as a center, a cover for said bowl having a contour corresponding to that of the upper edges of the walls, and said bowl and cover having interengaging means for forming a tight closure, and means for movably mounting said cover with such relation to said bowl that elevation of said cover the depth of the interengaging means will permit said bowl to be pivoted on its axis.

3. A mixing machine having a bowl pivoted on an axis so as to permit the bowl to rock on said axis, walls of said bowl having upper edges arcuately shaped along arcuate lines formed with said axis as a center, a cover for said bowl having a contour corresponding to that of the upper edges of the walls, and said bowl and cover having interengaging means for forming a tight closure, and means for movably mounting said cover with such relation to said bowl that elevation of said cover the depth of the interengaging means will permit said bowl to be pivoted on its axis, and means of clamping said cover onto said bowl.

4. A mixing machine having a bowl pivoted on an axis so as to permit the bowl to rock on said axis, walls of said bowl having upper edges arcuately shaped along arcuate lines formed with said axis as a center, a cover for said bowl having a contour corresponding to that of the upper edges of the walls, and said bowl and cover having interengaging means for forming a tight closure, and means for movably mounting said cover with such relation to said bowl that elevation of said cover the depth of the interengaging means will permit said bowl to be pivoted on its axis, and means of clamping said cover onto said bowl, said interengaging means comprising members extended from said cover, adapted in closed position to engage the inner faces of said bowl walls.

5. In a mixing machine a bowl element, said bowl element having a pair of opposite walls of convex shape formed on the curve of an arc with the bowl pivot as a center, said bowl having a pivotal bearing support so as to enable the bowl to be rocked, a cover for said bowl, having a concave contour similar to the convex opposite walls of the bowl, and means of elevating said cover sufficiently so as to permit the bowl to be rocked, said cover having depending portions adapted to engage walls of said bowl, said cover elevating means having a limit of elevating movement of slightly more than the depth of the depending portions of said cover.

6. In a mixing machine a bowl element, said bowl element having a pair of opposite walls of convex shape formed on the curve of an arc with the bowl pivot as a center, said bowl having a pivotal bearing support so as to enable the bowl to be rocked, a cover for said bowl, having a concave contour similar to the convex opposite walls of the bowl, and means of elevating said cover sufficiently so as to permit the said bowl to be rocked, and means of clamping said cover against said bowl so as to form a tight closure for said bowl, and said cover having depending portions adapted to engage upper edges and sides of walls of said bowl.

FRANK X. LAUTERBUR.
EDWARD J. LAUTERBUR.